United States Patent [19]

Okamoto et al.

[11] 3,737,201
[45] June 5, 1973

[54] METHOD AND APPARATUS FOR GENERATING A CONTROL SIGNAL FOR USE IN A VEHICLE BRAKE SYSTEM

[75] Inventors: Toshiaki Okamoto; Kazutaka Kuwana, both of Kariya, Aichi Pref.; Takefumi Sato, Osaka, all of Japan

[73] Assignees: Aisin Seiki Kabushiki Kaisha, Kariya; Sharp Corporation, Osaka, Japan

[22] Filed: June 24, 1970

[21] Appl. No.: 49,480

[52] U.S. Cl. ......... 303/21 A, 188/181 C, 303/21 BE
[51] Int. Cl. ................................................. B60t 8/08
[58] Field of Search .................. 188/181; 303/20, 303/21; 317/5; 324/161; 340/263

[56] References Cited

UNITED STATES PATENTS

| | | | |
|---|---|---|---|
| 3,245,213 | 4/1966 | Thompson et al. | 303/21 EB |
| 3,467,443 | 9/1969 | Okamoto et al. | 303/21 BE |
| 3,498,682 | 3/1970 | Mueller et al. | 303/21 BE |
| 3,275,384 | 9/1966 | Hirzel | 303/21 EB |
| 3,433,536 | 3/1969 | Skinner | 303/21 A |
| 3,503,654 | 3/1970 | Stamm | 303/21 EB |

*Primary Examiner*—Duane A. Reger
*Assistant Examiner*—Stephen G. Kunin
*Attorney*—Sughrue, Rothwell, Mion, Zinn & Macpeak

[57] ABSTRACT

A method and apparatus for generating and using pseudo vehicle speed signals for use with an anti-skid brake control system. A signal responsive to the rotational speed of a vehicle wheel is generated and used for producing a pseudo vehicle speed signal. A memory is used to store the pseudo vehicle-speed signal and the memory is discharged at a rate dependent upon the applied brake pressure of the brakes of the system. The value stored in the memory is compared with the wheel-rotational speed to control the anti-skid brake control system.

The improvement comprises the provision of a memory and control means adapted for increasing the reduction rate of a memorized vehicle speed voltage with increase of applied brake pressure and conversely for decreasing said voltage reduction rate with decrease of applied brake pressure.

13 Claims, 8 Drawing Figures

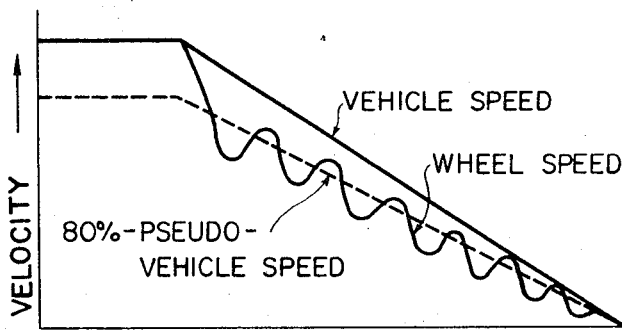
FIG. 1
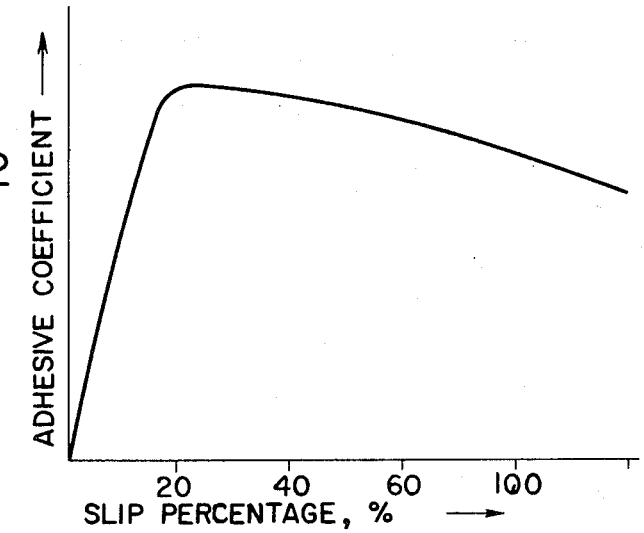
FIG. 2
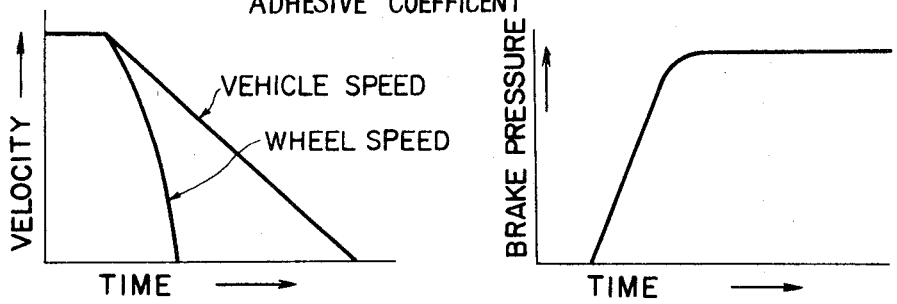
FIG. 4 RUNNING ON ROAD SURFACE OF A HIGH ADHESIVE COEFFICENT

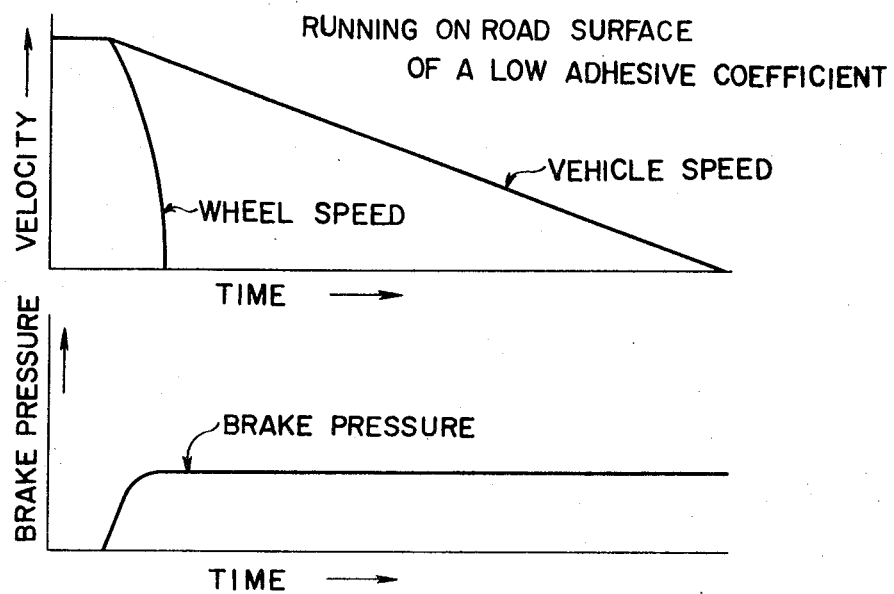
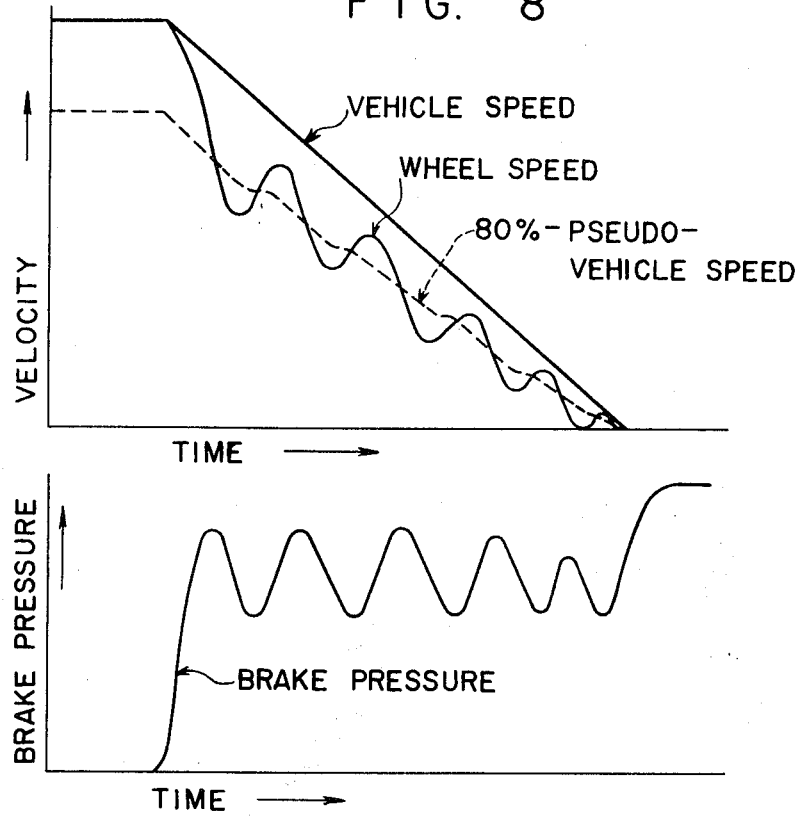

FIG. 5
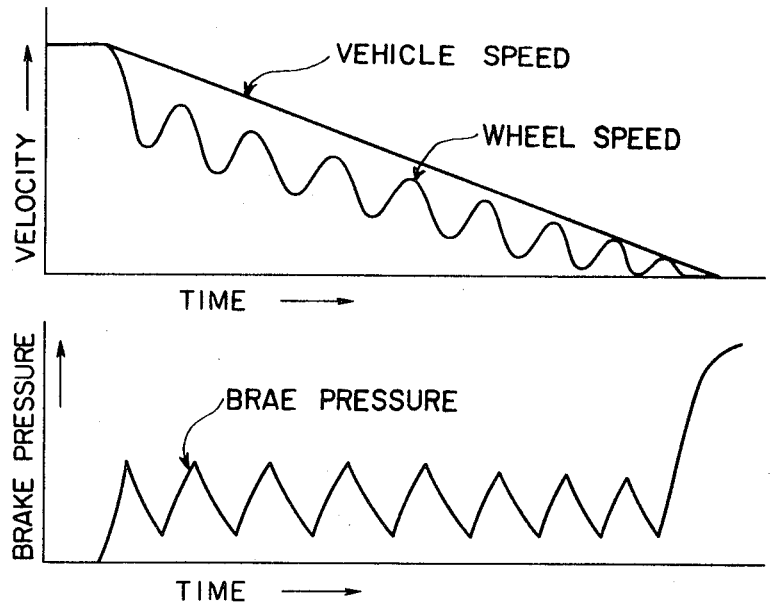
RUNNING ON ROAD SURFACE OF A LOW ADHESIVE COEFFICIENT
FIG. 6 RUNNING ON ROAD SURFACE OF A HIGE ADHESIVE COEFFICIENT
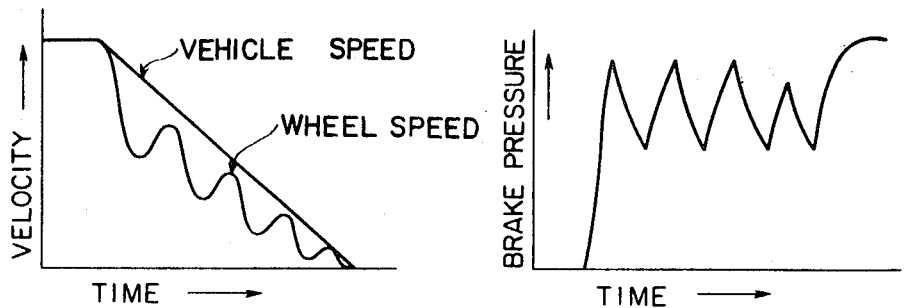
FIG. 7
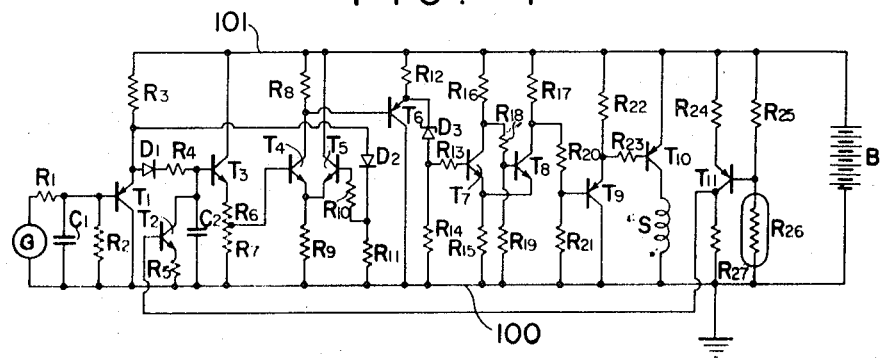

METHOD AND APPARATUS FOR GENERATING A CONTROL SIGNAL FOR USE IN A VEHICLE BRAKE SYSTEM

This invention relates to a method for the generation of a pseudo-vehicle speed signal for use with an anti-skid hydraulic brake system.

It is commonly known that if a sudden and excessive braking force is applied to the wheels of a travelling vehicle, the wheels are liable to become locked without rotation and a lateral slip may frequently be initiated on account of the heavy inertia of the vehicle.

In order to avoid this kind of wheel lock, an anti-skid hydraulic brake system has been proposed and is now in broad use, being adapted for performing an automatic control of the hydraulic brake pressure which is being applied to the vehicle wheels. This invention is concerned with a method for the generation of a pseudo-vehicle speed signal adapted for use in the operation of the above kind of brake pressure control.

Generally speaking, it is observed from practical experiments that a practically maximum value of the adhesive coefficient will be obtained with the slip percentage appearing between the wheel tire and the vehicle travelling surface and amounting to about 20 percent.

For attaining an optimum braking effort without locking the vehicle wheels, it has already been proposed to reduce the hydraulic brake pressure when the wheel speed becomes lower than a 80 percent — pseudo-vehicle speed and to increase the brake pressure when the wheel speed exceeds the above specified pseudo-speed so as to bring the wheels again into rotation. A prior method for obtaining the 80 percent—pseudo-vehicle speed resides in the sensing of the rate of speed reduction of the vehicle.

A drawback inherent in this prior art technique is the difficulty in the precise and accurate measurement of the vehicle speed reduction with variation in the slope of the road surface during the progress of wheel braking action. Therefore, it is not reliable to rely upon the measured value of the 80 percent—pseudo-vehicle speed.

It is an object of the present invention to provide a method for the generation of the pseudo-signal of the above kind which is substantially more reliable regardless of the road surface conditions.

A further object is to provide a method of the above kind to be carried out by use of an electronic circuit.

Still a further object is to provide a method of the above kind to improve substantially the performance of the anti-skid hydraulic pressure control.

These and further objects, features and advantages of the invention will become more apparent when the following detailed description of the invention is read with reference to the accompanying drawings.

In the drawings:

FIGS. 1 – 6 represents several explanatory charts for clarifying the principles of the inventive process.

FIG. 7 is an electric wiring diagram showing a preferred embodiment of an electric and electronic circuit adapted for carrying out the process according to the present invention.

FIG. 8 is an explanatory chart showing main working features of an apparatus adapted for carrying out the inventive process.

Referring now to the accompanying drawings, the invention will be described in detail hereinbelow.

In FIGS. 1 and 2, two explanatory charts illustrative of the principle embodied in the method according to the invention are shown.

At first, referring to FIG. 2, the adhesive coefficient has been plotted against the slip percentage of the vehicle wheel. As seen, the maximum value of adhesive coefficient will generally appear nearly at a slip percentage of about 20 percent which means that the wheel speed amounts to about 80 percent of the vehicle speed when applying a braking effort to the wheel.

In FIG. 1, a progress of brake application is shown graphically. In the upper chart, the speed of both of the vehicle and the wheel has been plotted against time. In this chart, the upper full line illustrates the vehicle speed and the dotted line shows the curve of the 80 percent — pseudo-vehicle speed as appearing during the progress of a brake application until the dead stop of the vehicle. The full lined wavy curve represents the wheel speed under control of an anti-skid brake control known per se.

In the lower chart in FIG. 1, the corresponding progress of the same braking period is shown in the form of fluctuation in the hydraulic brake pressure applied to the vehicle wheel under control of the anti-skid brake control mechanism known per se.

FIGS. 3 and 4 are similar views to FIG. 1, wherein a sudden and substantial braking pressure is being applied to the wheel. FIG. 3 is illustrative of the case where the adhesive coefficient is a certain low value, while FIG. 4 illustrates the case where the adhesive coefficient is a certain high value. It will be seen, from these figures that the difference between the vehicle speed and the wheel speed is considerably larger in comparison with that appearing in the normal and medium application of brake.

In these both cases shown in FIGS. 3 and 4, it will be seen that there is a strong tendency of wheel lock. It will be further seen that at a high value of adhesive coefficient appearing between the wheel tire and the road surface, an application of a higher brake pressure is necessary to realize a similar braking effort, and vice versa.

The basic principle of the present method resides in that the 80 percent — pseudo-vehicle speed is obtained in a highly reliable and substantially accurate way depending upon the brake pressure.

More specifically, according to the inventive method, it is understood that with higher brake pressure, the adhesive coefficient appearing between the wheel tire and the road surface will have a correspondingly higher value, and vice versa.

In practice, however, the brake pressure is not the sole parameter for the determination of the adhesive coefficient of the above kind. As a representative example, in the case wherein the wheel is subjected to locking, the aforementioned principle can not be applied. In the practical cases of the anti-skid brake control of the type adopted in practice, there is always a certain difference in the mean brake pressure between the cases of higher and lower adhesive coefficients which will serve the inventive purpose, as will be clearly seen from comparison of FIG. 5 with FIG. 6. The very existence of this appreciable brake pressure difference will serve for the determination of the variable value of the adhesive coefficient.

The specific manner for attaining the inventive purpose described above is to measure the 80 percent — vehicle speed which is obtained from the vehicle speed appearing directly before an application of the brake, and then the thus sensed 80 percent — vehicle speed is subjected to reduction in accordance with the degree of the brake pressure applied, so as to provide a reliable 80 percent — pseudo-vehicle speed.

In FIG. 7 "G" represents a d. c. generator or dynamo in a highly simplified and schematic way which is attached to a vehicle wheel or a wheel axle of a powered vehicle. The specific generator and mode of attachment is not shown since this feature is well known, especially in automotive engineering. Although not shown, the vehicle is fitted with a hydraulic brake means, preferably in the form of a conventional wheel cylinder, the applying hydraulic pressure of which is subjected to the anti-skid brake control action depending upon the pseudo-vehicle speed signal generated in accordance with the method of the invention.

The positive pole of the generator "G" is electrically connected through a resistor R1 to the base electrode of a transistor T1.

Across the generator "G", a smoothening condenser C1 and a further resistor R2 are connected in parallel. The negative pole of the generator "G" is connected through a conductor 100 to the negative side of a d.c. source shown at "B", The output from the generator "G" is current-amplified through the transistor T1 and a resistor R3 which is connected through a positive conductor 101 to the positive side of the d.c. source "B". A voltage responsive to the rotation of the related vehicle wheel and thus amplified is conveyed further through diode D1 and resistor R4 to a storage condenser C2 in which a voltage corresponding to the wheel speed is thus accumulated.

The wheel speed thus sensed is acknowledged to be the same as the vehicle speed when the brake is not applied. There might be a slight difference therebetween due to a slight amount of unavoidable wheel slip running on the road or other traffic surface, but, in practice, this minor difference may be neglected without causing an appreciable effect upon the inventive method.

The voltage responsive to the vehicle speed is utilized as the base voltage of transistor T3. It will be seen from FIG. 7, the emitter voltage of the transistor T3 is divided at resistors R6 and R7. In this way, and by the provision of a feedback connection to be described, a voltage which corresponds to 80 percent of the voltage at condenser C2, to be called "80 percent pseudo-vehicle speed voltage," is provided. This pseudo voltage is utilized as the base voltage of a transistor T4.

On the other hand, the emitter voltage of transistor T1, corresponding to the rotation of the vehicle wheel, is conveyed through diode D2 and resistor R10 to the base of transistor T5, the cathodic side of diode being grounded through resistor R11.

Transistors T4 and T5 and resistors constitute in combination a differential amplifier, adapted for sensing the difference between base voltages of transistors T4 and T5 and for amplifying the thus sensed voltage difference.

The output from the differential amplifier is then subjected to a current-amplification by the combination of transistor T6 and resistor R12, and the thus amplified current will be conveyed through Zener diode D3 and resistor R13 to a Schmitt circuit comprising transistors T7 and T8, resistors R15 – R19, the anodic side of the diode D3 being grounded through resistor R14.

When the emitter voltage of transistor T6 drops beyond a certain predetermined value, transistor T7 will turn off, while transistor T8 will turn on. A circuit part comprising transistors T9 and T10 and resistors R20 – R23 will act to current-amplify the output pulse signal from the said Schmitt circuit.

Solenoid S constitutes the electromagnetically energizing or actuating part of the conventional electromagnetic valve arranged in the conventional anti-skid brake control system of the conventional mode, adapted for reducing the hydraulic brake pressure in the case of skid-impending condition of the related vehicle wheel when the brake force is being applied to.

Transistors T2 and T11, resistors R5, R24, B25 and R27 constitute in combination a time constant modifying circuit, adapted for varying the equivalent resistance of transistor T2 in response to the resistance value of a pressure responsive resistor such as of the carbon pile type arranged in the hydraulic brake system for sensing the occasional hydraulic pressure prevailing therein, and thereby discharging the accumulated voltage in the condenser C2. In this condenser C2, the pseudo-vehicle speed voltage is accumulated.

The resistor R26 is a pressure responsive element which reduces its resistance value with an increase of the brake pressure to the related wheel when the brake is being applied.

The negative side of the voltage source "B" is grounded as shown, while the positive side thereof is connected through the conductor 101 and respective branch leads to resistors R3, R8, R12, R16, R17, R22 R24 and R25 and the collector sides of transistors T3 and T5 and the emitter side of transistor T10, respectively.

The operation of the circuit shown and described so far is as follows:

NORMAL RUNNING PERIOD

In this case a d.c. voltage will appear across the generator "G" responsive to the varying rotational speed of the vehicle wheel, because of the synchronous rotation of the generator rotating therewith, said induced voltage being applified at transistor T1, as was referred to hereinbefore. This voltage may be called the wheel rotational responsive voltage. In the storage condenser C2, the voltage responsive to the wheel speed is accumulated as was referred to hereinbefore, and will be discharged through a discharge circuit comprising the equivalent resistance of transistor T2 and the resistance R5.

When the vehicle is running with its brake unapplied and thus no braking effort is being applied to the related vehicle wheel, the base potential of transistor T2 is kept at a certain low value and the equivalent voltage at the collector-emitter passage of transistor T2 will become higher than otherwise. Thus, the voltage accumulated in storage condenser C2 becomes more difficult to discharge. The voltage applied to the condenser C2 does not become lower than that corresponding to the wheel speed.

The voltage at storage condenser C2 is conveyed to the combination of resistors R6 and R7 and is subjected to a voltage division, so as to set a 80 percent value of the pseudo-vehicle speed which is then applied to the base of transistor T4.

The said rotational responsive voltage and the newly procured 80 percent — pseudo-vehicle speed voltage are fed to the respective base electrodes of transistors T4 and T5 which constitute a differential amplifier, as was referred to herein-before. Since the rotational responsive voltage is higher in its value than the 80 percent — pseudo-vehicle speed voltage, transistor T4 becomes on, while transistor T6 will turn on and Zener diode D3 will become conductive so that the base voltage of transistor T7 becomes substantially higher than before. Therefore, the conductive state of transistor T7 and the non-conductive state of transistor T8 are maintained, and transistors T9 and T10 will become non-conductive. Thus, no current will flow through Solenoid S.

CONTROL OPERATION

With application of brake pressure upon the vehicle wheel under consideration, the resistance value of pressure-responsive resistor R26 will become smaller in correspondence to the applied brake pressure so that the base potential of transistor T11 will become lower and collector potential at the same transistor T11 will become increased. From this reason, the equivalent resistance of transistor T2 will become smaller and the storage condenser C2 will become more liable to discharge.

Although the wheel-rotation responsive voltage is reduced by the brake application, it will become higher than the 80 percent — pseudo-wheel velocity voltage when the applied brake pressure is so intensive as to bring the wheel into a locked condition. This is based upon the fact that the brake pressure is applied in correspondence to adhesive coefficient appearing between the wheel and the road surface and the wheel-revolution responsive voltage is not lowered beyond the 80 percent — pseudo-vehicle speed voltage.

On the other hand, when a sudden and substantial brake pressure is liable to invite a locked wheel, the wheel-rotational responsive voltage will fall suddenly so that it becomes nearer to the 80 percent — pseudo-vehicle speed voltage. Finally, the former voltage will fall beyond the latter voltage. In this case, the base potential of transistor T4 will become higher than the emitter voltage of the same transistor T4, thus the latter becoming conductive and an appreciable current will flow through resistor R8. Therefore, as was referred to hereinbefore, transistor T6 will turn on, transistor T7 off, transistor T8 on, Transistor T9 on and transistor T10 also on. Thus, solenoid S will become energized for reducing the brake pressure. In this way, the solenoid S will continue to be energized until the revolution-responsive voltage will rise up to the 80 percent — pseudo-vehicle speed voltage. When this voltage condition is realized, the solenoid S is de-energized and the brake pressure will be increased. However, on account of unavoidable time delay in the apparatus for performing the brake pressure reduction, the rotational-responsive pressure will become higher than the 80 percent — pseudo-vehicle speed voltage.

Upon repeated brake pressure increase and decrease, the vehicle is brought to a dead stop. This kind of operation can be easily seen from FIG. 6. As the means for modifying the discharging time constant for storage condenser C2 depending upon the appearing brake pressure, piezo-electric means, pressure-responsive switch or the like conventional means can be adopted.

In the foregoing, the voltages are explained in analogue quantities which can be, when necessary, replaced by corresponding digital quantities.

The embodiments of the invention in which as exclusive property or privilege is claimed are as follows:

1. A method for generating a control signal for use in a vehicle brake system and method including:
   a. generating a wheel speed signal which is a function of the varying speed of the vehicle wheel;
   b. generating a pseudo vehicle speed signal which is a function of said wheel speed signal and storing said pseudo speed signal in a memory device;
   c. generating a brake pressure signal which is a function of the vehicle brake pressure;
   d. reducing the value of the stored pseudo vehicle speed signal as a function of the brake pressure signal; and
   e. generating said control signal as a function of the reduced pseudo vehicle speed signal and the wheel speed signal.

2. The method as set forth in claim 1 wherein the step of generating said control signal includes
   a. taking the difference between said wheel speed signal and the reduced pseudo vehicle speed signal; and
   b. generating a signal which is a function of said difference.

3. An apparatus for generating a control signal for use in a vehicle brake system said apparatus comprising:
   a. first generating means for generating a wheel speed signal which is a function of the varying speed of a wheel of said vehicle;
   b. pressure signal means for generating a brake pressure signal which is a function of the pressure in said vehicle brake system;
   c. pseudo vehicle speed signal generating means for storing said wheel speed signal and for reducing the value of the stored signal as a function of said brake pressure signal;
   d. control signal generating means for receiving said wheel speed signal and said pseudo vehicle speed signal and for generating said control signal as a function of said received signals.

4. The apparatus as set forth in claim 3 wherein said pseudo vehicle speed signal generating means comprises:
   a. integrating means for integrating said wheel speed signal; and
   b. discharge means for discharging the accumulated value in said integrating means wherein said discharge means is responsive to said pressure signal means.

5. The apparatus as set forth in claim 4 wherein the rate at which said discharging means reduces the value accumulated in said integrating means increases with an increase in the brake pressure of the brake system of the vehicle.

6. The apparatus as set forth in claim 4 wherein said discharge means includes a semiconductor means which has an equivalent variable resistance which varies in response to variations in the brake pressure of said brake system.

7. The apparatus as set forth in claim 4 wherein said pressure signal means includes a variable resistance element which varies in response to changes in the brake pressure of the vehicle brake system.

8. The apparatus as set forth in claim 3 further including percentage means coupled to said pseudo vehicle speed signal generating means for generating a signal which is a predetermined percentage of said pseudo vehicle speed signal.

9. The apparatus as set forth in claim 8 wherein said predetermined percentage is 80 percent.

10. Apparatus for generating a pseudo vehicle speed signal for use with an antiskid control system for a brake system of a vehicle said apparatus comprising:
   a. means for generating a variable wheel speed signal which varies as a function of the speed of a wheel of the vehicle;
   b. pressure signal generating means for generating a signal which is a function of the pressure in the brake system;
   c. integrating means for integrating the wheel speed signal;
   d. discharging means for reducing the value of said integrated wheel speed signal, wherein said discharging means are responsive to said pressure signal generating means and wherein said reduced integrated wheel speed signal is said pseudo vehicle speed signal; and
   e. percentage means for generating a percentage signal which is a predetermined percentage of said pseudo vehicle speed signal.

11. The apparatus as set forth in claim 10 further including difference sensing means for sensing the difference between said percentage signal and said wheel speed signal and for providing a skid control signal which is a function of said difference.

12. The apparatus as set forth in claim 11 wherein said difference sensing means comprises a differential amplifier.

13. Apparatus for anti-skid control of a vehicle brake system said braking system being fitted with a brake pressure reducing means so as to reduce the braking force in response to a skid signal, said apparatus comprising:
   a. means for generating a variable wheel speed signal which is a function of the speed of a wheel of the vehicle;
   b. pressure signal generating means for generating a signal which is a function of the pressure in the brake system;
   c. means for generating a pseudo vehicle speed signal comprising:
      1. an integrating means for receiving said wheel speed signal;
      2. discharge means including a transistor coupled to said integrating means and to said pressure signal generating means for reducing the integrated value of said wheel speed signal wherein said discharging means has an equivalent resistance which varies as a function of said pressure signal; and
      3. voltage divider means for dividing the output of said integrating circuit in response to a predetermined percentage of the speed of said vehicle;
   d. skid signal generating means for generating a skid signal, said skid signal generating means including a differential amplifier having one input for receiving said wheel speed signal and another input for receiving the predetermined percentage of said pseudo speed signal and for taking the difference between said two signals;
   e. Schmitt trigger means coupled to the output of said differential amplifier and responsive thereto; and
   f. means coupled to said Schmitt trigger means for generating a skid signal in response to the output of said Schmitt trigger means.

* * * * *

UNITED STATES PATENT OFFICE
CERTIFICATE OF CORRECTION

Patent No. 3,737,201  Dated June 5, 1973

Inventor(s) Toshiaki Okamoto; Kazutaka Kuwana

It is certified that error appears in the above-identified patent and that said Letters Patent are hereby corrected as shown below:

After Item [21] insert--Foreign Application Priority Date June 25, 1969 Japan ..........50144/1969--

Signed and sealed this 19th day of February 1974.

(SEAL)
Attest:

EDWARD M. FLETCHER, JR.
Attesting Officer

C. MARSHALL DANN
Commissioner of Patents